(12) United States Patent  
Kumar et al.

(10) Patent No.: US 9,066,269 B1  
(45) Date of Patent: Jun. 23, 2015

(54) NETWORK HANDOVERS

(71) Applicant: Sprint Communications Company L.P., Overland Park, KS (US)

(72) Inventors: Rajat Kumar, Kansas City, MO (US); Krishna Sitaram, Chantilly, VA (US); Jay Douglas Cole, Overland Park, KS (US); Wen Xue, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 54 days.

(21) Appl. No.: 13/764,122

(22) Filed: Feb. 11, 2013

(51) Int. Cl.
  *H04W 36/00* (2009.01)
  *H04W 36/32* (2009.01)
  *H04W 36/14* (2009.01)
  *H04W 36/08* (2009.01)

(52) U.S. Cl.
  CPC .......... *H04W 36/0066* (2013.01); *H04W 36/32* (2013.01); *H04W 36/14* (2013.01); *H04W 36/08* (2013.01)

(58) Field of Classification Search
  CPC ..... H04W 36/18; H04W 36/10; H04W 36/32; H04W 36/30; H04W 36/22; H04W 36/38; H04W 36/385; H04W 52/40; H04W 36/0011; H04W 36/0016; H04W 36/0094; H04W 36/0066; H04W 64/006
  USPC ......... 455/442, 440, 444, 438, 439, 436, 437, 455/426.1, 450, 552.1, 435.1
  See application file for complete search history.

(56) References Cited

U.S. PATENT DOCUMENTS

| | | | |
|---|---|---|---|
| 6,438,376 B1* | 8/2002 | Elliott et al. | 455/437 |
| 8,457,038 B1* | 6/2013 | Xue et al. | 370/318 |
| 2008/0049675 A1* | 2/2008 | Burgan et al. | 370/331 |
| 2008/0064402 A1* | 3/2008 | Oh | 455/436 |
| 2011/0038350 A1* | 2/2011 | Gholmieh et al. | 370/331 |
| 2011/0189997 A1* | 8/2011 | Tiwari et al. | 455/443 |
| 2012/0002637 A1* | 1/2012 | Adjakple et al. | 370/331 |
| 2013/0072146 A1* | 3/2013 | Smith | 455/404.1 |
| 2013/0301609 A1* | 11/2013 | SMITH et al. | 370/331 |

* cited by examiner

*Primary Examiner* — Khai M Nguyen

(57) ABSTRACT

Systems, methods, and computer-readable media for network handovers are provided. An eNodeB of a fourth generation mobile telecommunications network identifies available channels of a third generation mobile telecommunications network in which to handover user devices. Once an available channel is identified, the user device may be handed off to the available channel without unnecessary latency.

19 Claims, 3 Drawing Sheets

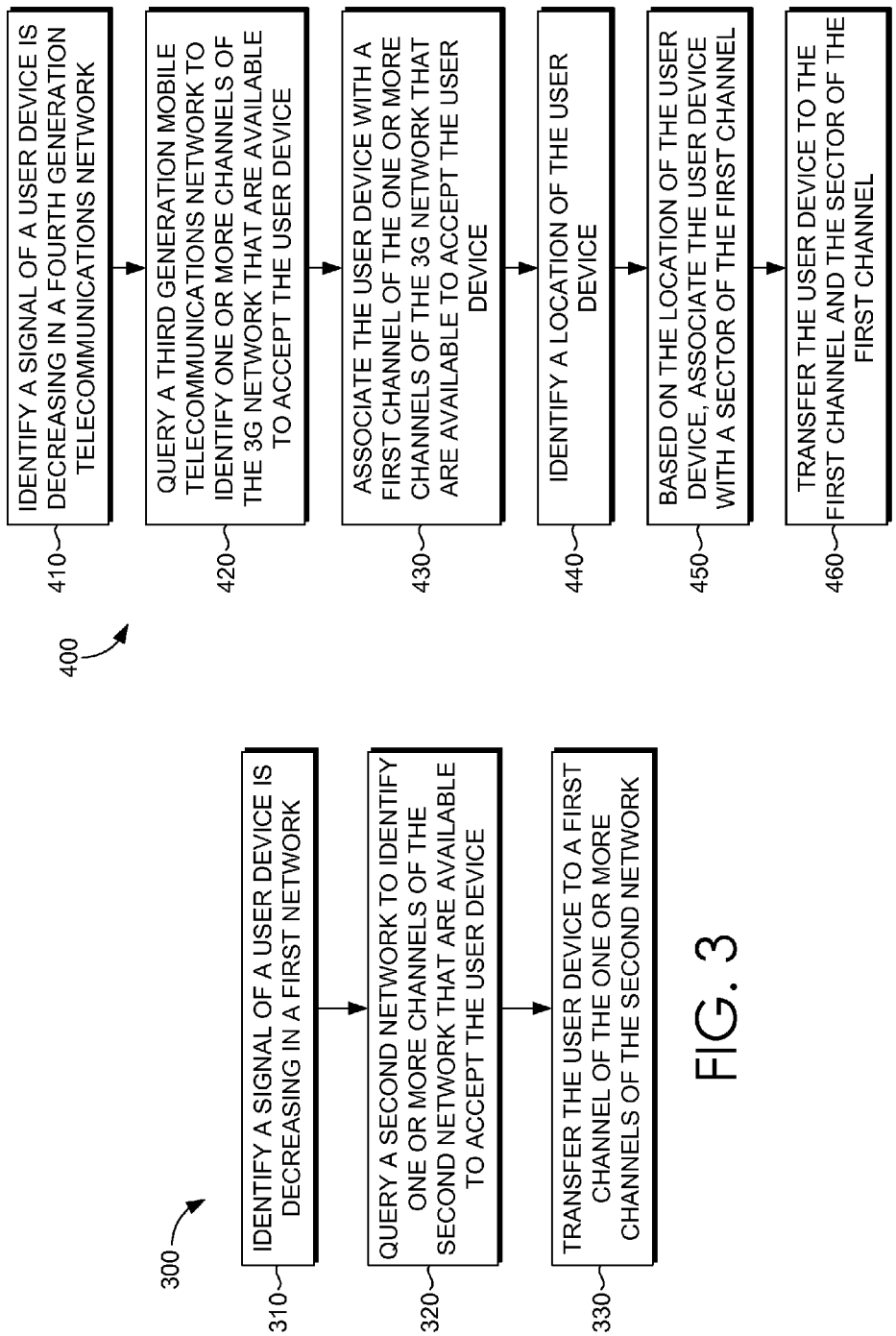

NETWORK HANDOVERS

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter. In brief, and at a high level, this disclosure describes, among other things, handing off user devices among different networks. Utilizing embodiments hereof, the receiving network (i.e., the network to which the user device will be transferred) may be queried by, for example, the transferring network (i.e., the network from which the user device will be transferred), to identify an available channel to receive the user device. This reduces unnecessary latency for network handovers.

BRIEF DESCRIPTION OF THE DRAWINGS

Illustrative embodiments of the present invention are described in detail below with reference to the attached drawing figures, and wherein:

FIG. 3 provides a first exemplary method for network handovers, in accordance with an embodiment of the present invention; and FIG. 4 provides a second exemplary method for network handovers, in accordance with an embodiment of the present invention.

DETAILED DESCRIPTION

Figure 1:
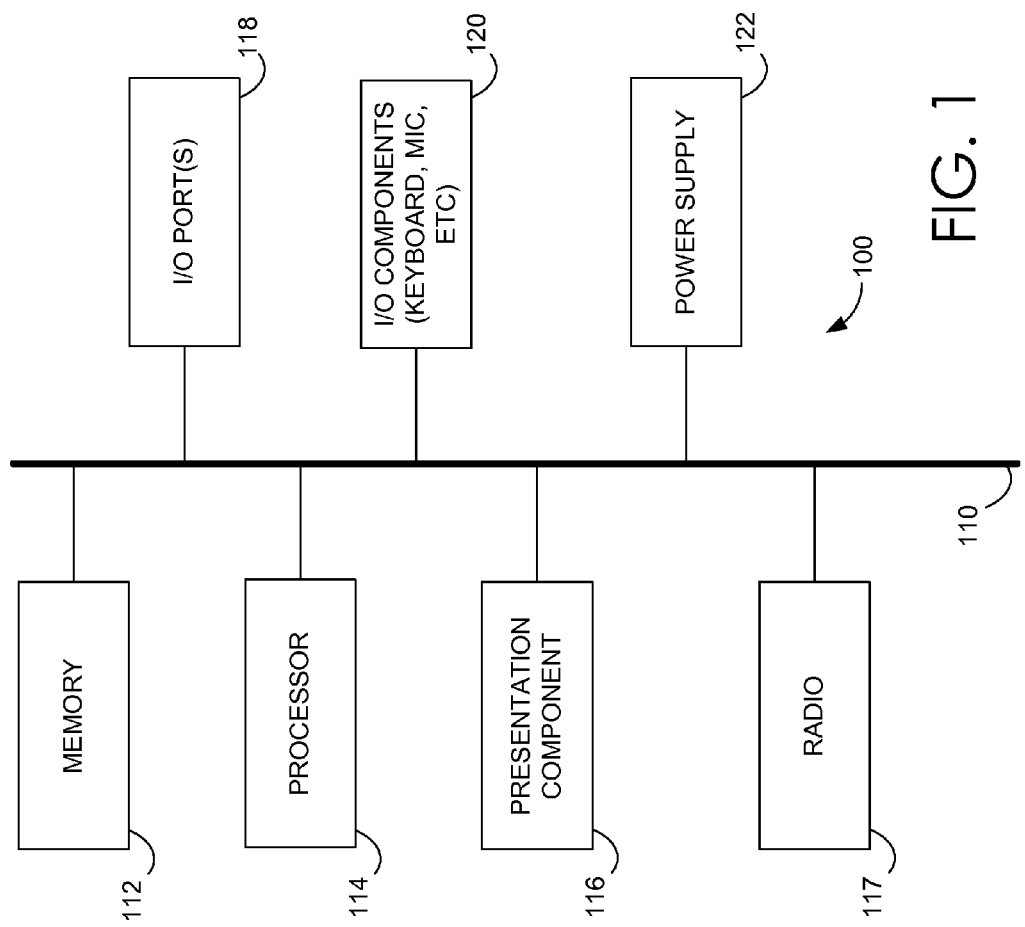
FIG. 1 depicts an exemplary computing device according to embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention provide systems, methods, and computer-readable media for network handovers. Utilizing embodiments hereof, the receiving network (i.e., the network to which the user device will be transferred) may be queried by, for example, the transferring network (i.e., the network from which the user device will be transferred), to identify an available channel to receive the user device. This reduces unnecessary latency for handovers.

Accordingly, in one aspect, the present invention is directed to one or more computer-readable storage media having computer-executable instructions embodied thereon that, when executed, perform a method. The method includes identifying a signal of a user device is decreasing in a first network; querying a second network to identify one or more channels of the second network that are available to accept the user device; and transferring the user device to a first channel of the one or more channels of the second network.

In yet another aspect, a system for network handovers is provided. The system includes a user device connected to a first network and a control component of a first network that queries a second network to identify one or more available channels. The user device may be a mobile phone. The control component is, in embodiments, an eNodeB of a 4G network. Identifying available channels rather than blindly assigning channels to user devices reduces unnecessary latency.

In another aspect, embodiments of the present invention are directed to one or more computer-readable storage media having computer-executable instructions embodied thereon that, when executed, perform a method. The method includes identifying a signal of a user device in a fourth generation mobile telecommunications network is decreasing; querying a third generation mobile telecommunications network to identify one or more channels of the 3G network that are available to accept the user device; associating the user device with a first channel of the one or more channels of the 3G network that are available to accept the user device; identifying a location of the user device; based on the location of the user device, associating the user device with a sector of the first channel; and transferring the user device to the first channel and the sector of the first channel.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

BTS Base Transceiver Station
3G Third Generation Mobile Telecommunications
4G Fourth Generation Mobile Telecommunications
CD-ROM Compact Disk Read Only Memory
CDMA Code Division Multiple Access
GPRS General Packet Radio Service
GSM Global System for Mobile communications: originally from Groupe Special Mobile
DVD Digital Versatile Discs
EEPROM Electrically Erasable Programmable Read Only Memory
eNodeB Evolved Node B
HLR Home Location Register
HSDPA High-Speed Downlink Packet Access
LTE Long Term Evolution
PC Personal Computer
PDA Personal Digital Assistant
RAM Random Access Memory
ROM Read Only Memory
TDMA Time Division Multiple Access
UMTS Universal Mobile Telecommunications System
VOIP Voice Over Internet Protocol
WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention provide systems, methods, and computer-readable media for network handovers. Accordingly, embodiments of the present invention handover user devices to different networks. For instance, the receiving network (i.e., the network to which the user device will be transferred) may be queried by, for example, the transferring network (i.e., the network from which the user device will be transferred), to identify an available channel to receive the user device. This reduces unnecessary latency for handovers.

Generally, when a user device is transferred from one network to another (e.g., a 4G network to a 3G network) a component of the transferring network simply communicates which channel of the receiving network to which the user device will be transferred to the user device without basing the transfer on any data. However, some channels may be overloaded (i.e., contain too many user devices to provide optimal support to each device) or under used (i.e., still have the ability to provide optimal support to devices in addition to those already contained on the channel). When a user device is instructed to attach to a channel that may be overloaded, the user device may be instructed by, for example, the component of the transferring network or a component of the receiving network, to try another channel. This adds unnecessary latency to the handover process. In particular, this may add an additional two to five seconds to the handover process.

Rather than blindly picking a channel in which to handover the user device, a component of the transferring network may query a separate component (e.g., a component of the receiving network or a BTS) to identify one or more available channels. In other words, a 4G network component may query a 3G network component or a BTS to identify a channel that is not yet overloaded or, alternatively, identify the best under loaded channel.

Figure 2:
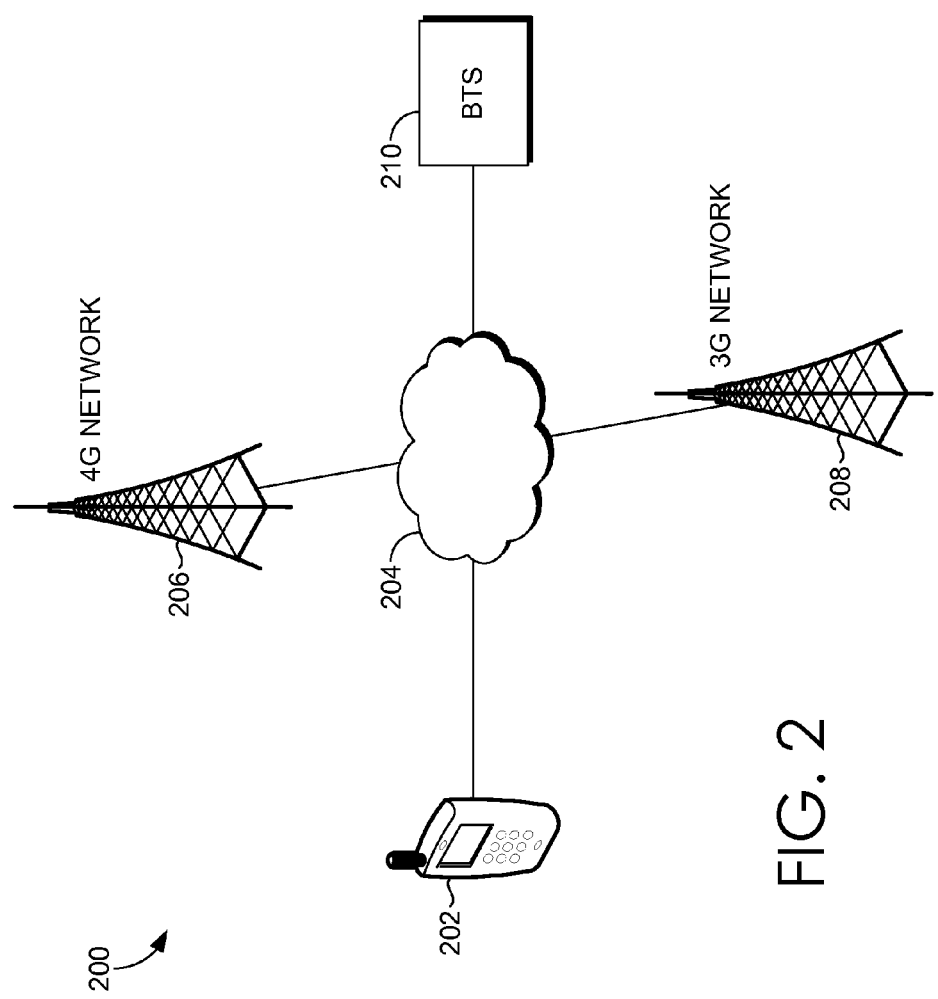
FIG. 2 is a schematic view of an exemplary network environment suitable for use in implementing embodiments of the present invention.

FIG. 2 provides an exemplary environment suitable for use in implementing embodiments of the present invention. Such an environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a user device 202 is communicatively coupled to one or more components of one or more networks. In the illustration, the user device 202 communicates with various components utilizing a network 204. The user device 202 can utilize network 204 to communicate with other components (e.g., a server(s), a personal computer(s), a BTS, etc.). In embodiments, the network is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. The network can include multiple networks, as well as being a network of networks, but is shown in more simple form so as to not obscure other aspects of the present invention. In embodiments, the network can be associated with a telecommunications provider that provides services to user devices. The network can be any communication network providing voice and/or data service(s), such as, for example, a 1x circuit voice, a 3G network (e.g., CDMA, CDMA2000, WCDMA, GSM, UMTS), or a 4G network (WiMAX, LTE, HSDPA).

As briefly mentioned above, the network 204 may include multiple networks. FIG. 2 illustrates that network 204 includes a 4G network 206 and a 3G network 208. These are exemplary networks and, in embodiments, the two networks of network 204 may be any two differing networks.

Returning to FIG. 2, the user device 202 is configured to, among other things, communicate with one or more other components of the system 200 such as the 4G network 206 or the components thereof. The network environment 200 further includes a BTS 210 that is configured to enable communication between the user device 202 and a network such as the 4G network 206 and the 3G network 208. The BTS may be any piece of equipment capable of enabling communication between a user device and a network.

When the user device 202 is connected to either the 4G network 206 or the 3G network 208 a signal is associated with the connection. Often times, when a signal is fading, user devices may be transferred among networks. In an embodiment, the user device 202 is transferred from the 4G network 206 to the 3G network 208. This transfer, or handover, may occur upon identifying a signal is fading. For instance, assuming the user device 202 is in the 4G network 206, the 4G network 206, or a component thereof, may identify that the signal of the user device 202 is fading. A specific embodiment includes an eNodeB of the 4G network 206 as the component of the 4G network 206 that identifies that the signal is fading or decreasing. Also, user devices may be handed over to a different network for reasons other than fading signals.

In a specific embodiment, assume a mobile phone is located in a 4G network coverage area. Upon identifying a signal of the user device 202 is fading or decreasing, the 4G network 206 or a component thereof may query the 3G network or a component thereof to identify one or more available channels. In particular, the eNodeB of the 4G network may query a BTS of the 3G network in order to identify one or more channels that are (1) not overloaded or (2) the best channels for the user device. A best channel for the user device may be a channel that is the least overloaded, associated with a location of the user device, or the like.

In embodiments, the eNodeB may continuously query the BTS to identify potential channels in which to handover a user device. Alternatively, the eNodeB may query the BTS at predefined time intervals (e.g., every 5 minutes, every hour, etc.). The eNodeB may also query the BTS in substantially real-time (i.e., upon identifying that a signal is fading and a channel in a different network is required).

Once one or more channels are identified by the eNodeB, the eNodeB may communicate to the user device the channel to which the user device will be transferred. By identifying an available channel beforehand, a potential latency of two to five seconds may be avoided. For instance, if a user device were instructed to handover to Channel A but Channel A is overloaded, it would take additional time to identify that Channel A is unable to receive the user device, to assign a new channel to the user device, to communicate the new channel to the user device, etc.

Additional embodiments of the present invention may further identify a sector associated with the one or more available channels in which to assign the user device. For instance, if a user device is instructed to handover to Channel A, the eNodeB may further identify that Sector 1 of Channel A is specifically where the user device should be transferred. Sectors may be assigned to user devices based on a location of the user device. The location of the user device is identified by the eNodeB as it is aware of the location of each device within its network.

Upon identifying the channel (and potentially a sector) in which to transfer the user device, the user device is transferred to the available channel (and potentially sector) identified as being available to accept the user device.

Further embodiments of the present invention alternate assignments of channels to user devices. For instance, assume that each channel of a receiving network is already overloaded but a user device must be transferred to the receiving network. In this case, an alternating scheme may be utilized. Specifically, a first user device may be assigned to a first channel but a subsequent user device will be assigned to a different channel to avoid really overloading an already overloaded channel. If possible, a user device may remain in the transferring network until an available channel is identified in the already overloaded receiving network.

Turning now to FIG. 3, a flow diagram is shown illustrating a first exemplary method 300 for network handovers, in accordance with an embodiment of the present invention. In embodiments, method 300 can be performed using a network environment such as that illustrated in FIG. 2. At block 310, a signal of a user device is identified as decreasing in a first network. The first network may be a long term evolution (LTE) network. At block 320, a second network is queried to identify one or more channels of the second network that is available to accept the user device. The second network may be a 3G network. The first network may query the 3G network by querying a BTS of the 3G network. At block 330, the user device is transferred to a first channel of the one or more channels of the second network that is available to receive the user device.

Turning now to FIG. 4, a flow diagram is shown illustrating a second exemplary method 400 for network handovers, in accordance with an embodiment of the present invention. At block 410 a signal of a user device is identified as decreasing in a 4G network. At block 420 a 3G network is queried to identify one or more channels of the 3G network that are available to accept the device. Specifically, a BTS of the 3G network may be queried. At block 430 the user device is associated with a first channel of the one or more channels of the 3G network that is available to accept the user device. At block 440 a location of the user device is identified and, based on the location of the user device, the user device is associated with a sector of the first channel at block 450. At block 460 the user device is transferred to the first channel and the sector of the first channel.

It will be understood by those of ordinary skill in the art that the order of steps shown in the method 300 of FIG. 3 and method 400 of FIG. 4 is not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more nontransitory computer-readable storage media having computer-executable instructions embodied thereon that, when executed, perform a method, the method comprising:
 identifying a signal of a user device is decreasing in a first network;
 querying a base transceiver station (BTS) in a second network to identify one or more channels of the second network that is available to accept the user device; and based on the identification of the signal of the user device that is decreasing, transferring the user device to a first channel of the one or more channels of the second network that was identified as available to accept the user device.

2. The media of claim 1, wherein the one or more channels of the second network is available when a channel is not overloaded.

3. The media of claim 1, wherein the first network is a fourth generation mobile telecommunications network.

4. The media of claim 1, wherein the second network is a third generation mobile telecommunications network.

5. The media of claim 1, wherein the querying is continuously performed regardless of the signal of the user device.

6. The media of claim 1, wherein the querying is performed at predefined time intervals.

7. The media of claim 1, wherein the user device is further associated with a sector of the first channel.

8. The media of claim 7, wherein the sector associated with the user device is based on a location of the user device.

9. The media of claim 8, wherein the location of the user device is received from the first network.

10. A system for network handoffs, the system comprising:
a user device connected to a first network; and
a control component of a first network, wherein the control component is configured to
A) identify a signal of the user device is decreasing in the first network,
B) query a base transceiver station (BTS) in a second network to identify one or more channels of the second network that are available to accept the user device, and
C) based on the identification of the signal of the user device that is decreasing, transfer the user device to a first channel of the one or more channels of the second network that was identified as available to accept the user device.

11. The system of claim 10, wherein the first network is a fourth generation mobile telecommunications network.

12. The system of claim 10, wherein the second network is a third generation mobile telecommunications network.

13. The system of claim 10, wherein the one or more available channels are not overloaded.

14. The system of claim 10, wherein the control component queries the second network continuously.

15. The system of claim 10, wherein the control component queries the second network at predefined time intervals.

16. The system of claim 10, wherein the control component is further configured to associate the user device with a sector of the one or more available channels.

17. The system of claim 16, wherein the sector associated with the user device is based on a location of the user device known to the control component.

18. One or more nontransitory computer-readable storage media having computer-executable instructions embodied thereon that, when executed, perform a method, the method comprising:
identifying a signal of a user device is decreasing in a fourth generation mobile telecommunications network;
upon identifying the decreasing signal, querying a third generation mobile telecommunications network, separate from the fourth generation mobile telecommunications network, to identify one or more channels of the third generation mobile telecommunications network that is available to accept the user device, wherein an available channel is a channel that is not overloaded with user devices;
associating the user device with a first channel of the one or more channels of the third generation mobile telecommunications network that is available to accept the user device;
identifying a location of the user device;
based on the location of the user device, associating the user device with a sector of the first channel; and
transferring the user device to the first channel and the sector of the first channel.

19. The media of claim 18, wherein the method is performed in real-time.

* * * * *